US 7,765,310 B2

(12) United States Patent
Graveline et al.

(10) Patent No.: US 7,765,310 B2
(45) Date of Patent: Jul. 27, 2010

(54) OPAQUE CRYPTOGRAPHIC WEB APPLICATION DATA PROTECTION

(75) Inventors: Marc Graveline, Ottawa (CA); Patrick Roy, Gatineau (CA); Ulf Viney, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 11/187,309

(22) Filed: Jul. 22, 2005

(65) Prior Publication Data
US 2006/0294206 A1 Dec. 28, 2006

(30) Foreign Application Priority Data
Jun. 23, 2005 (CA) .................................. 2510647

(51) Int. Cl.
G06F 15/16 (2006.01)
G06F 7/04 (2006.01)
G06F 17/30 (2006.01)
G06F 9/00 (2006.01)
G06F 17/00 (2006.01)
H04N 7/16 (2006.01)

(52) U.S. Cl. ................. 709/229; 709/203; 709/217; 709/218; 709/219; 709/246; 726/2; 726/11; 726/27; 726/29; 726/30

(58) Field of Classification Search .............. 726/2, 726/11, 22, 26, 28, 29, 30; 709/203, 217, 709/218, 219, 229, 246
See application file for complete search history.

(56) References Cited

U.S. PATENT DOCUMENTS 5,623,601 A * 4/1997 Vu .......................... 726/12
5,870,544 A * 2/1999 Curtis ....................... 726/14
5,933,498 A * 8/1999 Schneck et al. .............. 705/54
5,983,348 A * 11/1999 Ji ............................ 726/13
6,067,416 A * 5/2000 Fraser ...................... 717/178
6,098,056 A * 8/2000 Rusnak et al. ............... 705/75
6,125,366 A * 9/2000 Bernstein et al. ........... 707/103
6,144,739 A 11/2000 Witt et al.
6,195,794 B1 * 2/2001 Buxton ..................... 717/108

(Continued)

OTHER PUBLICATIONS

National Institute of Standards and Technology, "Secure Hash Standard", FIPS PUB 180-1, Apr. 17, 1995, pp. 1-16.

(Continued)

*Primary Examiner*—Rupal D Dharia
*Assistant Examiner*—Wing Ma
(74) *Attorney, Agent, or Firm*—Stephen J. Walder, Jr.; Erin C. Ming

(57) ABSTRACT

Mechanisms for external and distributed protection of Web application data against prying, tampering, and impersonation using cryptographic mechanisms are provided. The protection is offered opaquely so as to not expose the cryptographic mechanism to the Web application. Protection against prying prevents users from looking at data the Web application considers private. When protected against prying, protect data may be sent to the client but the user will not be able to understand it. Protection against tampering, guaranties the Web application that the data it is receiving originated from a trusted source, usually the Web application itself. A user session state stored client-side is a good candidate for tampering protection. Protection against impersonation ensures the Web application that the data it is receiving comes from a specific user.

23 Claims, 6 Drawing Sheets

U.S. PATENT DOCUMENTS

| | | | |
|---|---|---|---|
| 6,230,160 B1 * | 5/2001 | Chan et al. | 707/103 |
| 6,282,535 B1 * | 8/2001 | Pham et al. | 707/4 |
| 6,286,051 B1 * | 9/2001 | Becker et al. | 709/236 |
| 6,314,468 B1 * | 11/2001 | Murphy et al. | 709/236 |
| 6,321,337 B1 * | 11/2001 | Reshef et al. | 726/14 |
| 6,349,336 B1 * | 2/2002 | Sit et al. | 709/227 |
| 6,356,906 B1 * | 3/2002 | Lippert et al. | 707/10 |
| 6,381,735 B1 * | 4/2002 | Hunt | 717/158 |
| 6,385,661 B1 * | 5/2002 | Guthrie et al. | 719/316 |
| 6,393,497 B1 * | 5/2002 | Arnold et al. | 719/330 |
| 6,415,385 B1 * | 7/2002 | Cotugno et al. | 713/176 |
| 6,466,947 B2 * | 10/2002 | Arnold et al. | 707/104 |
| 6,487,714 B1 * | 11/2002 | Azagury et al. | 717/116 |
| 6,567,861 B1 * | 5/2003 | Kasichainula et al. | 719/330 |
| 6,578,144 B1 | 6/2003 | Gennaro et al. | |
| 6,604,143 B1 * | 8/2003 | Nagar et al. | 709/229 |
| 6,629,150 B1 * | 9/2003 | Huded | 709/247 |
| 6,684,329 B1 * | 1/2004 | Epstein et al. | 713/150 |
| 6,782,418 B1 * | 8/2004 | Cerrone et al. | 709/217 |
| 6,907,465 B1 * | 6/2005 | Tsai | 709/232 |
| 6,968,571 B2 * | 11/2005 | Devine et al. | 726/11 |
| 7,020,645 B2 * | 3/2006 | Bisbee et al. | 707/1 |
| 7,146,505 B1 * | 12/2006 | Harada et al. | 713/185 |
| 7,200,230 B2 * | 4/2007 | Knauft | 380/201 |
| 7,266,683 B1 * | 9/2007 | Nag | 713/154 |
| 7,392,323 B2 * | 6/2008 | Yim et al. | 709/236 |
| 7,543,018 B2 * | 6/2009 | Appelman | 709/203 |
| 7,647,597 B2 * | 1/2010 | Krishnaswamy et al. | 719/319 |
| 2001/0002929 A1 | 6/2001 | Mache | |
| 2001/0042058 A1 * | 11/2001 | Harrington et al. | 707/1 |
| 2002/0023220 A1 | 2/2002 | Kaplan | |
| 2003/0023873 A1 * | 1/2003 | Ben-Itzhak | 713/201 |
| 2006/0195895 A1 * | 8/2006 | Ben-Shachar et al. | 726/11 |

OTHER PUBLICATIONS

Internet RFC/STD/FYI/BCP Archives, "RFC 3548—The Base16, Base32, and Base64 Data Encodings", RFC 3548 (RFC3548), Jul. 2003, pp. 1-9.

National Institute of Standards and Technology, "The Keyed-Hash Message Authentication Code (HMAC)", FIPS PUB 198, Mar. 6, 2002, pp. i-vii and 1-13.

* cited by examiner

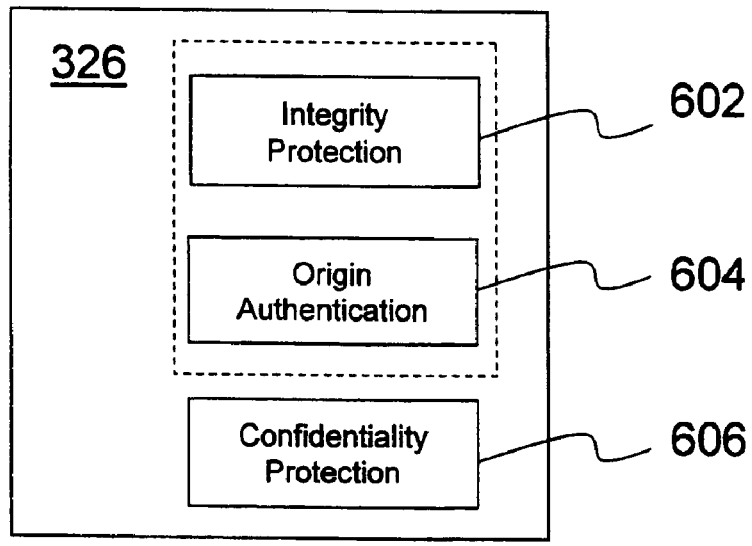
Figure 6
(a) 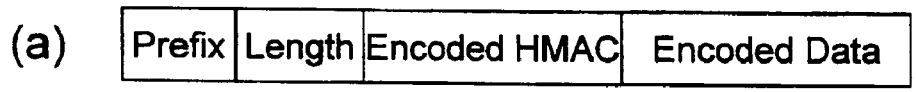
(b) 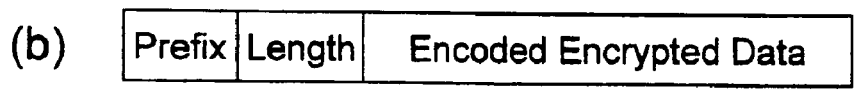
(c) 
Figure 8

OPAQUE CRYPTOGRAPHIC WEB APPLICATION DATA PROTECTION

TECHNICAL FIELD

The present invention relates to Web applications. More specifically, the present invention relates to Web application security.

BACKGROUND

The Internet is by far the largest, most extensive publicly available network of interconnected computer networks that transmit data by packet switching using a standardized Internet Protocol (IP) and many other protocols. The Internet has become an extremely popular source of virtually all kinds of information. Increasingly sophisticated computers, software, and networking technology have made Internet access relatively straightforward for end users. Applications such as electronic mail, online chat and Web client allow the users to access and exchange information almost instantaneously.

The World Wide Web (WWW) is one of the most popular means used for retrieving information over the Internet. The WWW can cope with many types of data which may be stored on computers, and is used with an Internet connection and a Web client. The WWW is made up of millions of interconnected pages or documents which can be displayed on a computer or other interface. Each page may have connections to other pages which may be stored on any computer connected to the Internet. Uniform Resource Identifiers (URI) is an identifying system in WWW, and typically consists of three parts: the transfer format (also known as the protocol type), the host name of the machine which holds the file (may also be referred to as the Web server name) and the path name to the file. URIs are also referred as Universal Resource Locators (URLs). The transfer format for standard Web pages is Hypertext Transfer Protocol (HTTP). Hyper Text Markup Language (HTML) is a method of encoding the information so it can be displayed on a variety of devices.

Web applications are engines that create Web pages from application logic, stored data, and user input. Web applications often preserve users' session state. Web applications may not require software to be installed in the client environment. Instead, Web applications make use of standard Web browser components to view server-side built pages. Web applications can also deliver services through programmatic interfaces, such as Software Development Kits (SDKs).

HTTP is the underlying transactional protocol for transferring files (text, graphic images, sound, video, and other multimedia files) between Web clients and servers. HTTP defines how messages are formatted and transmitted, and what actions Web servers and Web client browsers should take in response to various commands. A Web browser, as an HTTP client, typically initiates a request by establishing a TCP/IP connection to a particular port on a remote host. An HTTP server monitoring that port waits for the client to send a request string. Upon receiving the request string (and message, if any), the server may complete the protocol by sending back a response string, and a message of its own, in the form of the requested file, an error message, or any other information. Web pages regularly reference pages on other servers, whose selection will elicit additional transfer requests. When the browser user enters file requests by either "opening" a Web file by typing in a Uniform Resource Locator (URL), or clicking on a hypertext link, the browser builds an HTTP request.

Web applications have server and client components. The Web application logic can be distributed between the server and the client. State information about a user session is often stored client-side for performance reasons. The state information is Web application data used to remember previous activities by a user. Because it is stored at the client, the Web application data can be tampered with by a malicious user. An attack can occur when tampered Web application data is sent as part of a request back to the server. Cryptographic algorithms are available to prevent a user from tampering or prying at restricted data, such as state information.

The information being passed from the Web application to the client may be sensitive in nature. In a commercial transaction, this sensitive information may be simply the price of an item to be purchased, for example. In a Web application such as a business report engine, the information may include business intelligence, for example. Although the sensitive information may be hidden from an average user, a malicious user may be able to find a way to access this information due to the nature of the HTML language.

Because many Web applications are developed without strong security initially, there is often a need to add cryptographic data protection to existing Web applications. A frequent requirement when implementing a data protection solution for an existing Web application is to minimize the amount of changes in the Web application.

Various methods have been proposed in the prior art to verify the integrity of electronic documents and to protect the sensitive information by using cryptographic functions.

US Application 20020023220 describes a system in which a digital document is processed with a one-way cryptographic hash function to yield a digital fingerprint value that is associated with the digital document. A document identification number is created and is uniquely associated with the digital fingerprint DFP. Optional credential information may be associated with the document identification number and digital fingerprint. A registration certificate, that represents an optional electronic signature associated with the document and that includes the document identification and digital fingerprint, is promulgated and archived at a plurality of storage locations. The system can authenticate whether a putative document is the original document by generating a digital fingerprint value for the putative document and comparing it to digital fingerprints retrieved from various storage locations. An authentication mechanism can confirm that the electronic signature is unaltered.

US Application 20010002929 describes a keyed-hashing technique for authentication of messages communicated in a distributed system from an originator to a destination, whereby the data to be authenticated is concatenated with a private (secret) key and then processed by the cryptographic hash function. The data are transmitted together with the digest of the hash function from the originator to the destination. The data comprises temporal validity information representing the temporal validity of the data.

U.S. Pat. No. 6,578,144 describes a method and apparatus for constructing secure digital signature schemes using a "hash-and-sign" paradigm, while maintaining security.

U.S. Pat. No. 6,144,739 is directed to a method and apparatus for protecting software objects from external modification. A cryptographic seal protects the object at the object level and also supports secure inter-object communication. A software object is packaged in a crypto seal providing (1) a cryptographic code hasher for performing a cryptographic form of hashing on the code of the object, (2) a crypto seal communications authenticator which authenticates communications received by object, (3) a crypto seal encryptor which encrypts communications sent by the object, (4) a challenge manager which causes the cryptographic code hasher to perform its hashing function on the code of the object periodically and on demand when a challenge message is received, and (5) a communications interface which controls inter-object communication.

SUMMARY

The illustrative embodiments are directed to mechanisms for external and distributed protection of Web application data against prying, tampering, and impersonation using cryptographic mechanisms. The protection is offered opaquely so as to not expose the cryptographic mechanism to the Web application. Protection against prying prevents users from looking at data the Web application considers private. When protected against prying, protect data may be sent to the client but the user will not be able to understand it. Protection against tampering, guaranties the Web application that the data it is receiving originated from a trusted source, usually the Web application itself. Session state data, stored client-side, is a good candidate for applying tampering protection to this session state data. Protection against impersonation ensures the Web application that the data it is receiving comes from a specific user.

According to one aspect of the illustrative embodiments there is provided a method for protecting Web application data between a server and a client. The method comprises: building a response for the client, invoking a data protection service for the response, the response comprising a first data having a first state, and modifying the response by replacing the first data with a protected data. the method further comprises sending the modified response to the client, receiving a request with the protected data from the client, and passing the received protected data to the data protection service for verification and converting to the first data. Moreover, the method comprises restoring the request corresponding to the first state of the response and sending the request to a Web application.

According to another aspect of the illustrative embodiments, there is provided a storage medium readable by a computer encoding a computer program for execution by the computer to carry out a method for protecting Web application data between a server and a client. The computer program comprises instructions, which when executed by the computer, cause the computer to build a response for the client, invoke a data protection service for the response, the response comprising a first data having a first state, and modify the response by replacing the first data with a protected data. The instructions further cause the computer to send the modified response to the client receive a request with the protected data from the client and pass the received protected data to the data protection service for verification and converting to the first data. The instructions further cause the computer to restore the request corresponding to the first state of the response send the request to a Web application.

According to another aspect of the illustrative embodiments, there is provided a computer system for protecting Web application data between a server and a client. The computer system comprises a processor and a memory coupled to the processor, the memory comprising instructions which, when executed by the processor, cause the processor to build a response for the client, invoke a data protection service for the response, the response comprising a first data having a first state, and modify the response by replacing the first data with a protected data. The instructions further cause the processor to send the modified response to the client, receive a request with the protected data from the client, and pass the received protected data to the data protection service for verification and converting to the first data. The instructions further cause the processor to restore the request corresponding to the first state of the response and send the request to a Web application.

BRIEF DESCRIPTION OF THE SEVERAL VIEWS OF THE DRAWINGS

These and other features of the invention will become more apparent from the following description in which reference is made to the appended drawings wherein:

FIG. 4 (b) shows a query originated from the fill-out form in FIG. 4 (a);

FIG. 6 illustrates three data protection functions in an application firewall;

FIGS. 8 (a), (b) and (c) illustrates structural examples of protected data according to present invention.

DETAILED DESCRIPTION

Reference will now be made in detail to some illustrative embodiments of the invention including the best modes contemplated by the inventors for carrying out the invention. Examples of these illustrative embodiments are illustrated in the accompanying drawings. While the invention is described in conjunction with these illustrative embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
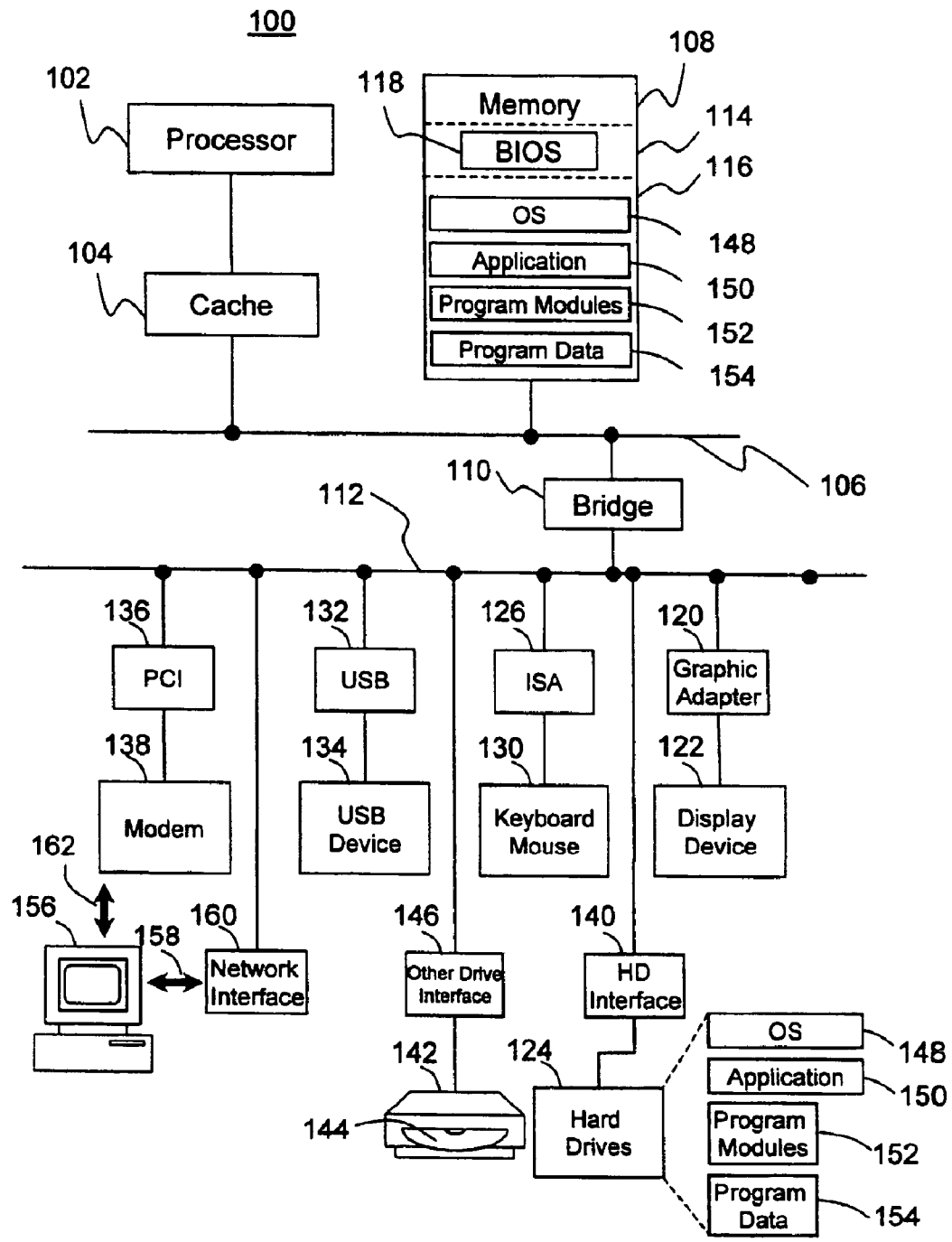
FIG. 1 shows a generic computing system in which the illustrative embodiments may be implemented.

FIG. 1 and the following discussion are intended to provide a brief general description in which FIG. 1 illustrates a block diagram of a suitable computing system in which an illustrative embodiment of the present invention may be implemented.

Those skilled in the art will appreciate that the illustrative embodiments may be practiced with many computer system configurations, including personal computers, hand-held devices, multi-processor systems, microprocessor-based or programmable consumer electronics, network PCs, mini-computers, mainframe computers and the like. The illustrative embodiments may also be practiced in distributed computing systems where tasks are performed by remote processing devices that are linked through a communications network. In a distributed computing system, program modules may be located in both local and remote memory storage devices.

Although not required, the illustrative embodiments will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the illustrative embodiments may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the illustrative embodiments and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
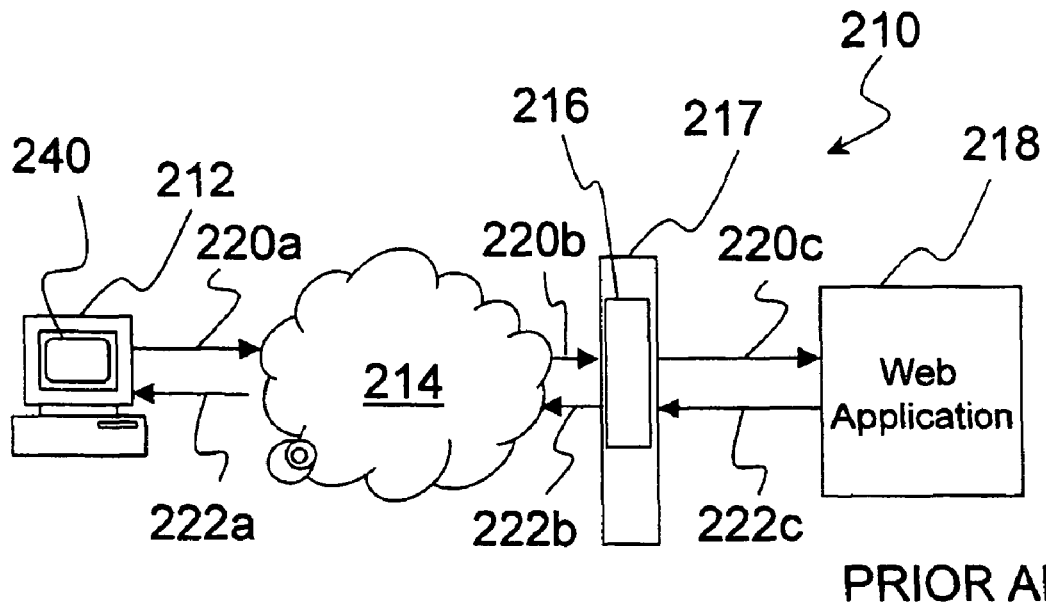
FIG. 2 shows a generic overview of a Web application environment.

FIG. 2 provides an overview of a network 210 with an application firewall 216 separating the Web application 218 with the client browser 240 on a computer 212 over a public network 214 such as Internet. The Web server 217 generally monitors the requests 220 from a Web browser 240 to a Web application 218. The Web server 217 may include a firewall 216. One example of the Web applications 218 is a business reporting engine (RE).

Figure 3:
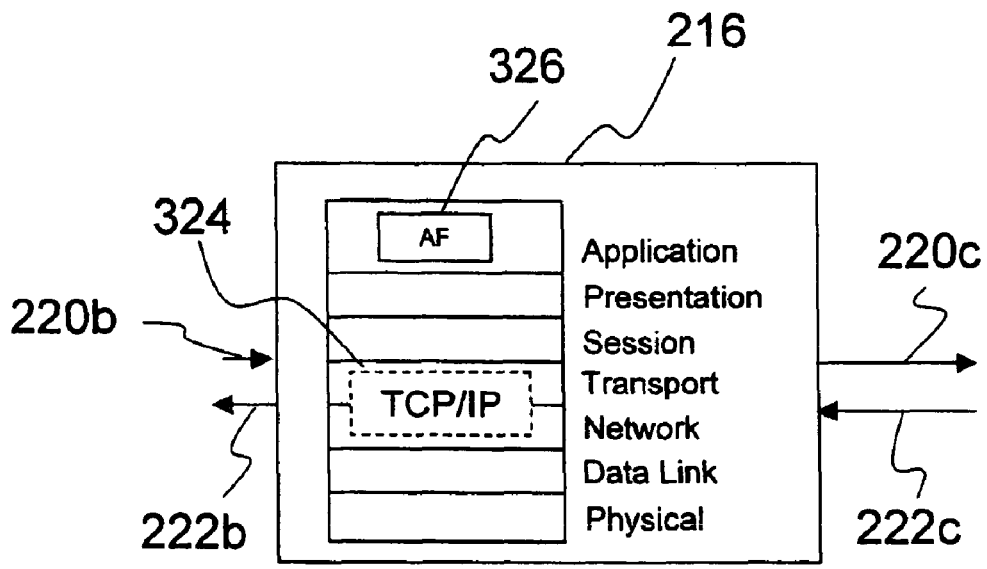
FIG. 3 shows examples of firewalls in relation to the OSI model.

Referring to FIG. 3, one type of firewalls is the network layer firewall 324 operating at the TCP/IP protocol stack as IP-packet filters, allowing packets to pass through the firewall only when they match the rules. The rules could be defined by the user; or by default. Network firewalls exist in most computer operating system and network appliances. Network firewalls deal with the numerous possible combinations that are to be allowed and forbidden at the transmission control protocol (TCP) and Internet protocol (IP) level.

Another type of firewall is an application layer firewall (326) operating at the application layer of a protocol stack. It may be a host using a proxy server or gateway, or a module embedded within an application. The purpose of an application firewall is to proxy traffic instead of routing it. As it works at the application layer, it may be configured to inspect the contents of the traffic, blocking what the firewall administrator views as inappropriate content, such as invalid request or attempts to exploit logical flaws in the application. The application firewall may be configured by a set of predetermined rules that are read at the time of startup.

A service to a Web application may be delivered through a simple interface hiding the complexity of the logic. This solution is called opaque in that the complex logic of the data protection service is not perceived by the Web application. For example, an opaque interface to a data protection service offers services to a Web application without exposing the complexity of the cryptographic operations. To achieve higher opaqueness, the data protection service needs to protect the data so that it can reside in its original location and safely travel in requests (220) and responses (222). A data protection service can protect Web application data against prying, tampering, or impersonation.

The illustrative embodiments are directed to a protection service in an application firewall (326). The application firewall has the ability to modify requests and responses transmitted through it. The application firewall is therefore able to protect data before the data leaves or reaches the Web application. The application firewall can also offer a programming interface to the Web application to offer data protection services. The protection service used to protect Web application server state will be described in details hereafter.

Web application server state is data used by the server, and is stored in the client environment for performance reasons. When the Web application server receives a request with server state data in it, the Web application server uses the data to reconstitute the user session context. If not secured, the server state data may be tampered with by a malicious user client-side and then sent to the server. The tampered with data, i.e. the tampered data, when used to build the user session context can crash the server, result in a privilege escalation, or other forms of security exploit.

Figure 4:
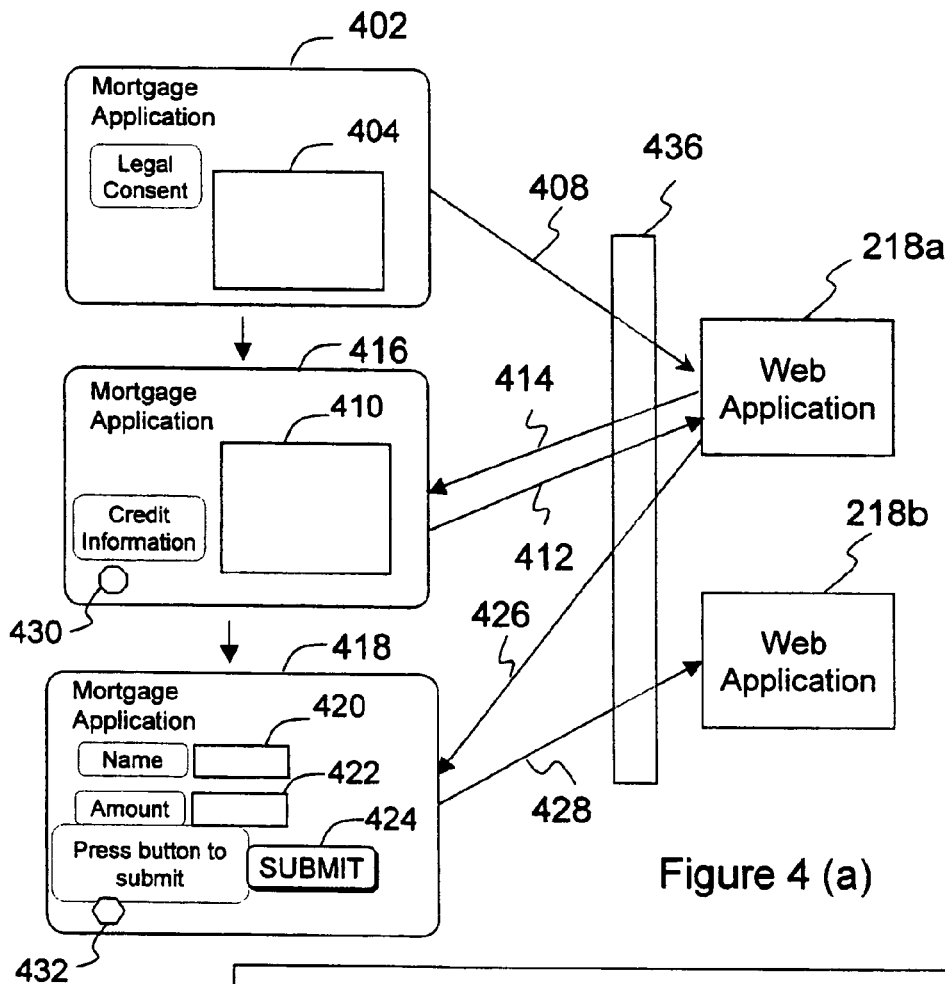
FIG. 4 (a) shows an example of client browser with a fill-out form showing different Web pages during exchanges of requests and responses.

Referring to FIGS. 2 and 4, an example of a figurative mortgage application is shown at different stages 402, 416, 418 with different data protections. The first Web client browser page 402 being displayed is for a legal consent 404. The request 408 from the client browser page 402 to Web application 218*a* may be protected through integrity protection and origin authentication. The response 414 from the Web application 218*a* to the client browser page 416 constitutes a server state 430 for this client page. The server state 430 comprises, for example, integrity protected legal consent. Similarly, the Web application 218*a* and the client browser may exchange information related to credit information 410 through another request 412 and response 426. This information may be protected through confidentiality protection, and may form part of the server state information 432 on client browser page 418. The server state information 432 now has both the integrity protected legal consent and the confidentiality protected credit information. Web client browser page 418 has a fill-out form with two text input fields 420, 422 and two hidden fields with the server states illustrated as {integrity protected legal consent} and {confidentiality protected credit information} in FIG. 4 (*b*). The data will be sent to the Web application 218 through a request 428 after the submit button 424 is pressed. FIG. 4 (*b*) shows the corresponding implementation in HTML. It should be apparent to a person skilled in the art that more than one Web application, for example Web applications 218*a* and 218*b* as illustrated in FIG. 4 (*a*), may be used for responding to the requests from the Web client browser. In addition, a firewall, such as an application firewall 436, is usually used between the Web applications 218 and the Web client browser.

To secure its server state data, the Web application may have one or more of these requirements: integrity, authentication, and confidentiality. Integrity is required most of time. It requires the data to have the exact same value as when inserted in the response to the client. Authentication is required when the Web application enforces that data is received from a specific user. The purpose is to prevent a malicious user to from sending data it captures from other users. Confidentiality is required if the data contains secret information that cannot be viewed by anyone outside the server.

Figure 5:
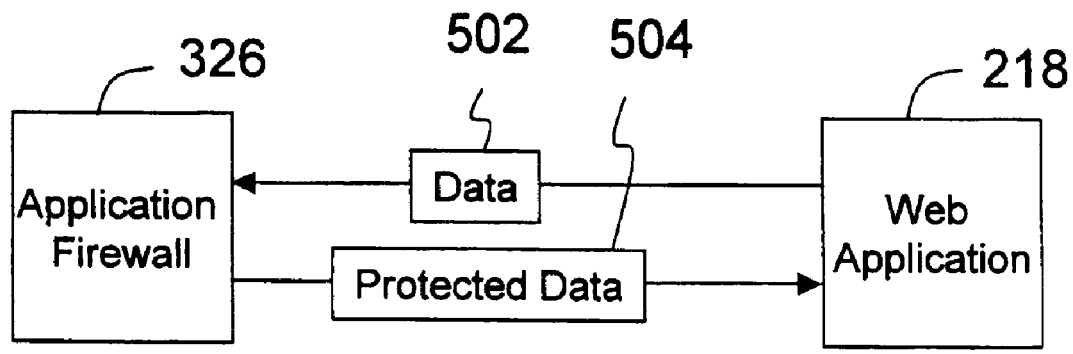
FIG. 5 (a) and (b) show examples of relationships between application firewall and Web applications.
Figure 5:
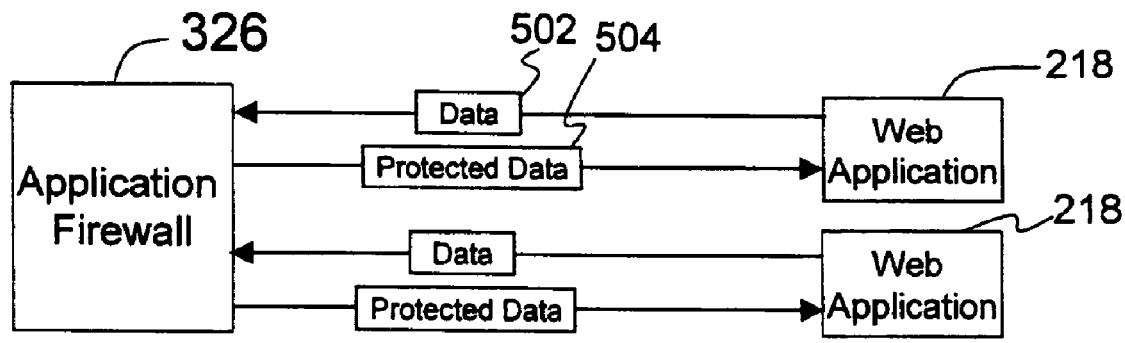

Referring to FIG. 5 (*b*), when building a response in accordance with one illustrative embodiment of the present invention, the Web application 218 sends its server state data 502 to an application firewall 326 with protection requirements. FIG. 5 (*b*) is an example of a single application firewall 326 providing data protection services to multiple Web applications 218. To minimize the impact on the Web application the application firewall will take a parameter value and return a replacement protected value. As used herein, the term parameter may include, but is not limited to, a GET request query parameter, a form POST body parameter, or an XML attribute or element.

FIG. 6 illustrates the tasks which may be accomplished at the application firewall 326: integrity protection 602; origin authentication 604 and confidentiality protection 606. An example of a protection request may have the requirements to protect response data for integrity, origin authentication, and confidentiality. The application firewall 326 invokes the appropriate cryptographic operations 602, 604, 606, encodes the protected data so as to safely travel between the client and the server, and then wraps the data with the addition of a prefix to recognize its protected state. This wrap protected value is returned 504 to the Web application to replace the original value in the response. There are no other parameters created to store cryptographic information.

Integrity protection may be implemented in the application firewall using a cryptographic keyed hash message authentication code (HMAC). Standard for the cryptographic keyed HMAC may be found at: csrc.nist.gov/publications/fips/fips198/fips-198a.pdf, the entirety of the document is incorporated hereby by reference. The HMAC key is secret to the application firewall. The HMAC value and its length are included in the wrapped protected data. The hashing algorithm is configurable in the application firewall. The default algorithm is SHA-1 from the Secure Hash Standard. Secure hash standard is described at www.itl.nist.gov/fipspubs/fip180-1.htm, the entirety of the document is incorporated herein by reference.

Origin authentication protection may be accomplished by concatenating the user session token to the end of the data prior to it being protected for integrity. The user session token is a unique value associated with the user. Origin authentication protection requires integrity protection.

Confidentiality protection is accomplished by using an encryption symmetric key algorithm on the data. The encryption key is secret to the application firewall. The encryption algorithm is configurable in the application firewall. One of the examples of the encryptions is RSA Security RC-4 (40-bit key). When both confidentiality and integrity protection are required, encryption is performed before integrity.

For safe travel in HTTP responses and requests, some of the encoded data needs to be encoded. For example, the HMAC is binary data that could not be sent as a replacement value to any parameter. The application firewall may thus use the Base64 encoding (www.faqs.org/rfcs/rfc3548.html) to render the encoded data Web safe. Example of a Base64 encoding maybe found at www.faqs.org/rfcs/rfc3548.html, the entirety of the document is incorporated herein by reference.

When integrity protection is required, the original data is also Base64 encoded to avoid accidental modifications to it. For example, spaces or carriage returns can be inserted by clients for readability, using Base64 encoding creates an uninterrupted string that is not subject to formatting modifications.

The protection information and the encoded data are wrapped to facilitate their transport. A unique prefix is used at the beginning of the value to identify its protected state. The prefix is terminated by a letter indicating which protection and encoding was applied to the data. For example, "CAFS" may be used as a prefix for an authentication protection that has been Base64 encoded. The prefix is followed by the length of the protected data. When multiple protections are used, multiple wrapping occurs; a wrap value becomes the un-protected data for the other protection.

Figure 7:
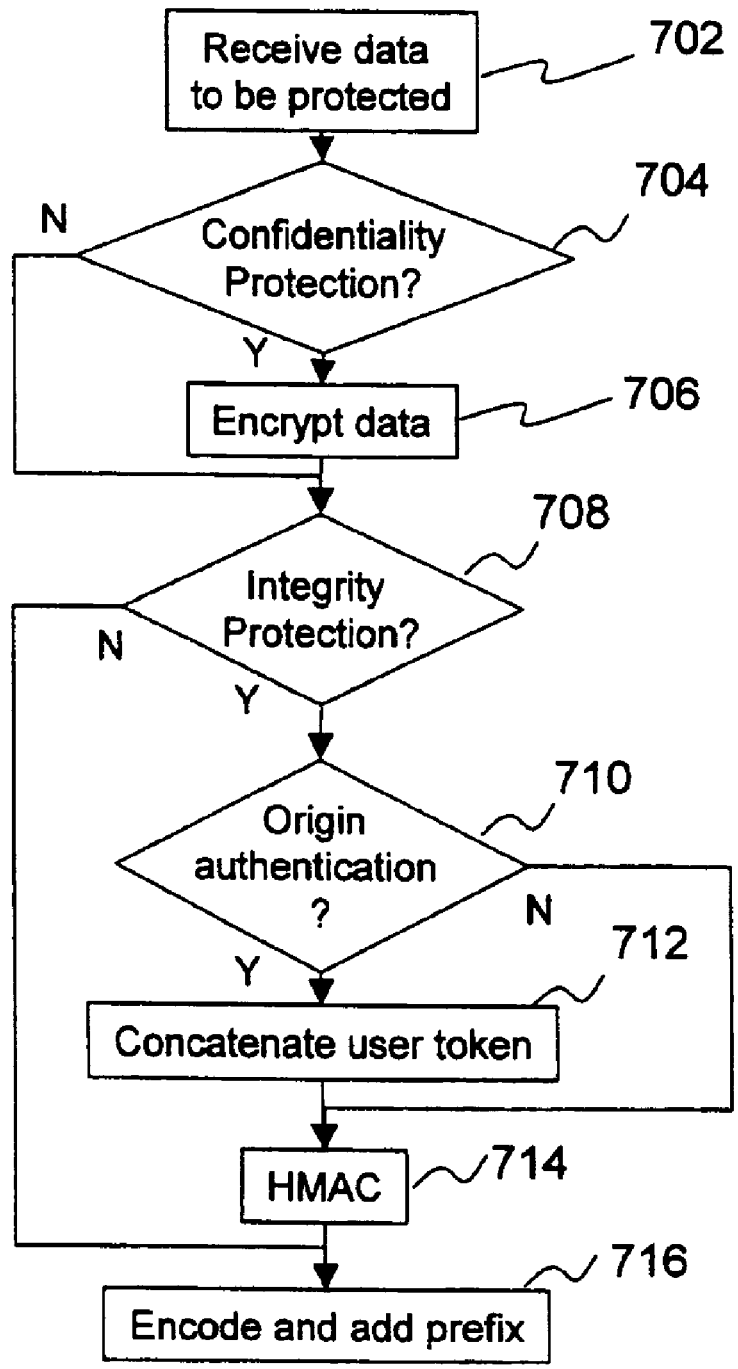
FIG. 7 illustrates a flowchart of a data protection process according to one illustrative embodiment of the present invention.

FIG. 7 shows an example of data protection in an application firewall 326. After the data which is to be protected is received 702, it is first decided whether confidentiality needs to be protected 704. If yes, the data is encrypted 706 the data is to be protected for its integrity 708, and authenticated for its origin 710, respectively, before the data is cryptographically encoded 714. The HMAC'ed data is encoded, for example, using Base64 and the prefix may be added 716.

FIG. 8 shows examples of a protected data structure: (a) HMAC encoded data; (b) encoded encrypted data; and (c) HMAC encoded and encrypted data.

When a request is received, the application firewall examines it for protected data. Based on a parameter rules part in the application firewall, the application firewall verifies the protected data and restores it to its unprotected state if required. A parameter rule declares a given parameter, usually specified by name, to require a protected state. A parameter rule may specify that the restore to the original value will be skipped in the application firewall because it will be handled by a separate call from the Web application. This is convenient when a Web application wants to reuse the same protected data in multiple responses without having it unwrap or decrypt for every request. The verification is performed even if the restore is skipped.

The verification of protected data occurs when parameter rules have an integrity requirement. To verify a value, the application firewall retrieves the original data value from the wrap protected data. It then performs the same HMAC logic as done to protect the value. The resulting HMAC value must match the HMAC value that was stored as part of the wrapped data. The two HMACs match only if the received data is the exact same data as when protection was invoked. A malicious user cannot create fake HMAC protected data bundles because he is not aware of the application firewall secret used to key the HMAC algorithm. When authentication is required, the user session token is also added, thus the two HMACs match only if the same user session token was used when protection was invoked. In the case of a HMAC mismatch, a verification failure, the application firewall blocks the request.

When a parameter rule specifies that protect data should not be unwrap in the application firewall, the Web application is responsible to call the application firewall to unwrap it and obtain the original data before using it.

One of the advantages of the present invention is to limit changes to the Web application. By only adding simple calls to the application firewall at the exit and entry point of data in the Web application, the risk of negative impact on the Web application is minimized. Opaqueness has been achieved by having the Web application request one or more of three protection requirements on its data. The Web application may not be aware that cryptographic operations are performed. The application firewall data protection service can easily be shared between multiple Web applications.

The illustrative embodiments can be implemented in digital electronic circuitry, or in computer hardware, firmware, software, or in combinations thereof. Apparatus of the illustrative embodiments can be implemented in a computer program product tangibly embodied in a machine-readable storage device for execution by a programmable processor; and method actions can be performed by a programmable processor executing a program of instructions to perform functions of the illustrative embodiments by operating on input data and generating output. The illustrative embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method, in a computing system, for protecting Web application data between a server and a client comprising:
building, by the server, a response for the client;
invoking, by the server, a data protection service for the response, the response comprising a first data having a first state;
modifying, by the server, the response by replacing the first data with a protected data;
sending, by the server, the modified response to the client;
receiving, in the server, a request with the protected data from the client;
passing, by the server, the received protected data to the data protection service for verification;
restoring, by the server, the request corresponding to the first state of the response at the data protection service; and sending, by the server, the request to a Web application, wherein:

the protected data comprises server state data having multiple wrappers, each wrapper having an associated data protection service recognizable prefix a portion of the server state data to which a particular protection operation, corresponding to the data protection service recognizable prefix associated with that wrapping, has been applied, the data protection service recognizable prefix identifies a type of data protection service applied to the portion of the server state data, the protected data is built up from multiple requests sent from the client to the server, with each wrapper in the multiple wrappers being added to the protected data in response to the server processing a corresponding request from the client, the particular protection operation applied to the portion of server state data, and identified by the data protection service recognizable prefix, for each wrapper is one of a confidentiality protection operation that prevents viewing of data by entities outside the server, an integrity protection operation that ensures that data has a same value as when the data is inserted into a response to a request, or an origin authentication operation that enforces that data is received from a specific user, at least two wrappers in the multiple wrappers have different data protection service recognizable prefixes, identifying different types of data protection services, and portions of server state data to which different particular protection operations have been applied.

2. The method as claimed in claim 1, wherein the first data is protected based on protection rules in the data protection service.

3. The method as claimed in claim 1, further comprising providing a data characteristic to the data protection service by the Web application; whereby the data protection service decides protection logic of the data protection service to be applied to the first data.

4. The method as claimed in claim 1, wherein a plurality of data protection services are invoked, and wherein the data protection services are external to the multiple Web applications.

5. The method as claimed in claim 4 wherein the plurality of data protection services are shared between the multiple Web applications.

6. The method as claimed in claim 1, wherein modifying the response further comprises replacing the parameter values with a replacement protected value.

7. The method as claimed in claim 1, wherein the data protection service comprises an interface to the Web application providing services for protection against at least one of prying, tampering, or impersonation; thereby hiding cryptographic details from the Web application.

8. The method as claimed in claim 1, wherein the data protection service encodes the data for safe travel between the client and server.

9. A non-transitory storage medium readable by a computer encoding a computer program for execution by the computer to carry out a method for protecting Web application data between a server and a client, the computer program comprising instructions which, when executed by the computer, cause the computer to:

build a response for the client;

invoke a data protection service for the response, the response comprising a first data having a first state;

modify the response by replacing the first data with a protected data;

send the modified response to the client;

receive a request with the protected data from the client;

pass the received protected data to the data protection service for verification and converting to the first data;

restore the request corresponding to the first state of the response; and send the request to a Web application, wherein:

the protected data comprises server state data having multiple wrappers, each wrapper having an associated data protection service recognizable prefix and a portion of the server state data to which a particular protection operation, corresponding to the data protection service recognizable prefix associated with that wrapping, has been applied, the data protection service recognizable prefix identifies a type of data protection service applied to the portion of the server state data, the protected data is built up from multiple requests sent from the client to the server, with each wrapper in the multiple wrappers being added to the protected data in response to the server processing a corresponding request from the client, the particular protection operation applied to the portion of server state data, and identified by the data protection service recognizable prefix, for each wrapper is one of a confidentiality protection operation that prevents viewing of data by entities outside the server, an integrity protection operation that ensures that data has a same value as when the data is inserted into a response to a request, or an origin authentication operation that enforces that data is received from a specific user, at least two wrappers in the multiple wrappers have different data protection service recognizable prefixes, identifying different types of data protection services, and portions of server state data to which different particular protection operations have been applied.

10. The storage medium according to claim 9, wherein the first data is protected based on protection rules in the data protection service.

11. The storage medium according to claim 9, wherein the instructions further cause the computer to provide a data characteristic to the data protection service by the Web application; whereby the data protection service decides protection logic of the data protection service to be applied to the first data.

12. The storage medium according to claim 9, wherein a plurality of data protection services are invoked, and wherein the data protection services are external to the multiple Web applications.

13. The storage medium according to claim 9, wherein the plurality of data protection services are shared between the multiple Web applications.

14. The storage medium according to claim 9, wherein the data protection service encodes the data for safe travel between the client and server.

15. A computer system for protecting Web application data between a server and a client comprising:

a processor; and a memory coupled to the processor, wherein the memory comprises one or more program modules which, when executed by the processor, cause the processor to:

build a response for the client;

invoke a data protection service for the response, the response comprising a first data having a first state;

modify the response by replacing the first data with a protected data;

send the modified response to the client;

receive a request with the protected data from the client;

pass the received protected data to the data protection service for verification and converting to the first data;

restore the request corresponding to the first state of the response; and send the request to a Web application, wherein:

the protected data comprises server state data having multiple wrappers, each wrapper having an associated data protection service recognizable prefix and a portion of the server state data to which a particular protection operation, corresponding to the data protection service recognizable prefix associated with that wrapping, has been applied, the data protection service recognizable prefix identifies a type of data protection service applied to the portion of the server state data, the protected data is built up from multiple requests sent from the client to the server, with each wrapper in the multiple wrappers being added to the protected data in response to the server processing a corresponding request from the client, the particular protection operation applied to the portion of server state data, and identified by the data protection service recognizable prefix, for each wrapper is one of a confidentiality protection operation that prevents viewing of data by entities outside the server, an integrity protection operation that ensures that data has a same value as when the data is inserted into a response to a request, or an origin authentication operation that enforces that data is received from a specific user, at least two wrappers in the multiple wrappers have different data protection service recognizable prefixes, identifying different types of data protection services, and portions of server state data to which different particular protection operations have been applied.

16. The computer system according to claim 15, wherein the first data is protected based on protection rules in the data protection service.

17. The computer system according to claim 15, wherein the plurality of data protection services are shared between the multiple Web applications.

18. The computer system according to claim 15, wherein the data protection service encodes the data for safe travel between the client and server.

19. The method of claim 1, wherein the first value is one of a GET request query parameter, a form POST body parameter, or an XML element.

20. The method of claim 1, wherein modifying the response by replacing the first data with a protected data comprises applying one of a confidentiality protection operation, an integrity protection operation, or an origin authentication operation to the first data to thereby generate the protected data.

21. The method of claim 2, wherein the protection rules specify that the restoring the request operation is to be skipped in the data protection service, and wherein the restoring the request operation is skipped such that the request that is sent to the Web application is the request received from the client with the protected data.

22. The method of claim 21, further comprising:

performing a call by the Web application to an application firewall in response to receiving the request in the Web application, the call being a request for a restore operation to restore the request to a state corresponding to the first state of the response, and wherein the data protection service of the application firewall performs the restore operation in response to the call.

23. The method of claim 1, further comprising:

forwarding the request with the protected data to the Web application; and receiving a call from the Web application, the call being for a restoration operation for restoring the request with the protected data to a state corresponding to the first state, wherein the restoring the request and sending the request operations are performed in response to receiving the call.

* * * * *